United States Patent [19]

Douglass et al.

[11] Patent Number: 4,663,388

[45] Date of Patent: May 5, 1987

[54] PROCESS FOR PRODUCING FILLED OR REINFORCED POLYMER COMPOSITIONS

[75] Inventors: Eugene F. Douglass, Decatur, Ill.; Michael J. Sullivan, Chicopee, Mass.; Austin H. Young, Decatur, Ill.

[73] Assignee: A. E. Staley Manufacturing Company, Decatur, Ill.

[21] Appl. No.: 762,749

[22] Filed: Aug. 5, 1985

[51] Int. Cl.$^4$ .................... C08B 15/06; C08B 15/10
[52] U.S. Cl. ................... 525/54.3; 525/54.31; 525/54.32; 526/238.2; 526/238.21; 526/238.22; 527/312
[58] Field of Search ............ 525/54.2, 54.21, 54.22, 525/54.23, 54.24, 54.26, 54.3, 54.31, 54.32; 526/238.2, 238.21, 238.22, 238.23; 527/312

[56] References Cited

U.S. PATENT DOCUMENTS 4,060,506 11/1977 Verbanac .............. 526/238.22
4,490,516 12/1984 Verbanac .............. 525/54.3
4,557,951 12/1985 Verbanac .............. 525/54.3

OTHER PUBLICATIONS

Naitove et al., "Reinforced Plastics '85, Exploring New Approaches" *Plastics Technology*, Mar., 1985, pp. 73–80.

*Primary Examiner*—John Kight
*Assistant Examiner*—Nathan M. Nutter
*Attorney, Agent, or Firm*—James B. Guffey; Michael F. Campbell; Philip L. Bateman

[57] ABSTRACT

Saccharides having pendant ethylenically unsaturated groups covalently bonded thereto are employed as coupling agents in filled and/or reinforced polymer compositions. Said saccharide is applied to the surface of a particulate or fibrous filler and/or reinforcing material and the resulting saccharide-coated filler and/or reinforcing material is intimately mixed with the polymer material to be filled and/or reinforced thereby.

22 Claims, No Drawings

PROCESS FOR PRODUCING FILLED OR REINFORCED POLYMER COMPOSITIONS

BACKGROUND OF THE INVENTION

The present invention pertains to processes for producing filled and/or reinforced polymer compositions and to the use of ethylenically unsaturated saccharide substances as coupling agents within such processes.

Generally speaking, filled and/or fiber reinforced polymer compositions or composites are well known items of commerce and find widespread use in the manufacture of a variety of shaped articles and other products. The polymer matrix of such filled or reinforced compositions can be either thermoplastic or thermosetting in character.

In the case of thermoplastic polymer-based systems, the filler or fiber material is generally compounded or incorporated into the polymer material via a melt processing/mixing procedure as, for example, in an extrusion compounding operation and shaped articles made from the resulting filled or reinforced thermoplastic polymer compositions can be conveniently fabricated via conventional injection molding techniques.

In the case of themosetting polymer-based compositions, the desired filler or fiber ingredient is typically admixed with or blended into one or more prepolymer ingredients (or polymer precursor materials) as, for example in a roll compounder, planetary mixer, etc. at some stage prior to the final curing or crosslinking operation employed in forming the final or finished filled or reinforced, thermoset product or article. Examples of such thermosetting polymer-based, reinforced and/or filled compositions include those which are commonly referred to in the art as "bulk molding compounds" (BMC), "sheet molding compounds" (SMC) and "reaction injection molding" (RIM) resins or systems.

In the preparation of filled and/or reinforced polymer compositions of the sort described above, it is common practice to employ a coupling agent to enhance the interfacial adhesion between the filler or fiber reinforcing material and the polymer matrix and to thereby improve the mechanical or physical properties (e.g., tensile strength, impact strength, etc.) of the resulting filled or reinforced polymer composite.

Coupling agents available and/or proposed for use to date include titanates, zirconates, silanes and methacrylato chromium complexes. While such known coupling agents have met with notable success in improving the physical properties of various composite systems, certain problems or obstacles (such as water sensitivity and/or lack of effectiveness for some classes of filler and/or polymer materials) still remain unresolved for at least some types of polymer/filler or fiber-based composite systems. Moreover, the various coupling agents available to date, for the most part, have the further disadvantage of being relatively expensive materials thereby adding significantly to the cost of composite systems in which they are employed.

As is apparent from the foregoing, there continues to be a need for the development or discovery of new and improved coupling agent materials and, particularly, for materials which are effective as coupling agents but which are relatively inexpensive compared to presently available coupling agent ingredients.

SUMMARY OF THE INVENTION

It has now been discovered that saccharide materials having ethylenically unsaturated groups covalently bonded thereto function very effectively as coupling agents in filled and/or reinforced polymer compositions. Such discovery is usefully emloyed in the present invention to provide a process for the preparation of filled and/or reinforced polymer compositions, said process comprising the steps of:
(a) applying a coating of a coupling agent material to the surface of a particulate or fibrous filler and/or reinforcing material, said coupling agent material comprising a saccharide derivative having pendant ethylenically unsaturated groups covalently bonded thereto; and
(b) intimately admixing the resulting coated filler and/or reinforcing material with a natural or synthetic polymeric material.

The indicated process can be beneficially employed for the preparation of filled and/or reinforced thermoplastic or thermoset polymer compositions for use in fiber reinforced plastic (FRP) applications, bulk molding compound (BMC) and sheet molding compound (SMC) products and processes, reaction injection molding (RIM) products and applications, filled thermoplastic resin compositions, and the like.

The indicated saccharide coupling agents and the process of the present invention are most advantageously employed in a fashion or under circumstances (e.g., in curable or thermosetting compositions which ultimately cure or crosslink via an addition polymerization mechanism) such that the ethylenically unsaturated groups of said coupling agents can actively participate in at least the final stages of polymerization, curing or crosslinking within the specific filled and/or reinforced polymer composition of concern.

DETAILED DESCRIPTION OF THE INVENTION

Ethylenically unsaturated saccharide materials or derivatives suitable for use as coupling agents herein include both mono- and polysaccharides (and various known derivaties of same) which have been treated, reacted or derivatized so as to attach (i.e., covalently bond) an ethylenically unsaturated group thereto. Thus, the coupling agent materials of interest herein may be based upon or derived from monosaccharide starting materials such as glucose, fructose, xylose, arabinose, ribose, mannose, galactose, gulose, and the like; polysaccharide materials such as sucrose, starch, polydextrose, cellulose, cellulose derivatives such as methyl cellulose, ethyl cellulose, carboxymethyl cellulose, hydroxyethyl cellulose, cellulose acetate, cellulose acetate butyrate, cellulose acetate propionate, etc.; mono- and polysaccharide derivatives such as alkyl monoglycosides (e.g., methyl glucose, ethyl glucoside, propyl glucoside, butyl glucoside, etc.), alkyl polyglucosides (e.g., lower alkyl polyglucosides, etc.), and the like.

Such saccharide starting materials can be conveniently treated to covalently bond the requisite ethylenically unsaturated groups thereto by reacting same with a coreactant containing both the desired ethylenically unsaturated group or functionality and a group, functionality or moiety which is suitably reactive with the hydroxyl groups contained on or by said saccharide starting material. Coreactants suitable for use in such fashion thus include ethylenically unsaturated acids such as acrylic acid, methacrylic acid, crotonic acid and the like; ethylenically unsaturated coreactants bearing hydroxyl-reactive, ether forming groups (e.g., N-methylol and N-methylthiol groups, etc.) such as N-hydroxymethyl acrylamide, N-mercaptomethyl acrylamide N-hydroxymethyl-2-alkyl acrylamides, N-mercaptomethyl-2-alkyl acrylamides, and the like. Typically, the resulting ethylenically unsaturated saccharide materials of interest will contain an average of from about 0.01 to about 1.0 (preferably from about 0.01 to about 0.5 and most preferably from about 0.05 to about 0.5) covalently bonded ethylenically unsaturated groups for each saccharide group or repeating unit within the saccharide or polysaccharide starting material employed.

Techniques suitable for reacting the aforementioned coreactants with hydroxyl-bearing saccharide materials are generally known to those skilled in the art [as illustrated, for example, by reference to U.S. Pat. No. 2,837,512 to Mantell (issued June 3, 1958); U.S. Pat. No. 3,936,428 to Rosenkranz et al (issued Feb. 3, 1976); U.S. Pat. No. 4,060,506 to Verbanac (issued Nov. 29, 1977) and U.S. Pat. No. 4,490,516 to Verbanac (issued Dec. 25, 1984)] and are therefore believed to need no further discussion herein.

Ethylenically unsaturated saccharide materials preferred for use in the practice of the present invention include starch derivatives being pendant ethylenically unsaturated groups (especially acrylamide or 2-alkyl acrylamide groups as well as N-substituted derivatives thereof) covalently bonded thereto such as, for example, those of the type described in U.S. Pat. No. 4,060,506 (Verbanac; issued Nov. 29, 1977) the teachings of which are incorporated by reference herein.

Preferred unsaturated saccharides for use herein also include cellulose derivatives having pendant ethylenically unsaturated groups (particularly acrylamide groups, 2-alkylacrylamide groups and N-substituted derivatives thereof) covalently bonded thereto. Of such materials, those of special interest include polymerizable cellulosic ester or ether products which are capable of homopolymerization and copolymerization with vinyl monomers and which are soluble in organic solvents. Products of that sort [which are derived from cellulose ester or ether starting materials having an ester or ether degree of substitution of between 2.0 and about 2.9 and which have been further derivatized by reacting same with a suitable acrylamide reactant (e.g., an acrylamide or 2-alkylacrylamide reactant containing a methylol or methylthiol group) so as to attach (i.e., covalently bond) pendant acrylamide functionality thereto in an amount corresponding to an acrylamide functionality degree of substitution of at least about 0.05] are described in U.S. Pat. No. 4,557,951 (Verbanac; issued Dec. 10, 1985) and in U.S. Pat. No. 4,490,516 (Verbanac; issued Dec. 25, 1984), the teachings of both of which are hereby incorporated by reference.

Polymeric materials suitable for use herein to form the polymer matrix within the filled or reinforced polymer compositions of interest include both natural and synthetic polymer materials and said polymer materials can suitably be either thermoplastic or thermosetting (or thermosetable) in character. Thus, for example, polymer materials to which the present invention is applicable include polyolefins such as polyethylene, polypropylene, etc; homopolymers and copolymers of vinyl aromatic monomers such as polystyrene, styrene/butadiene copolymers, styrene/acrylonitrile copolymers, acrylonitrile/butadiene/styrene (ABS) resins, acrylate polymers such as polymethylmethacrylate, polyethyl acrylate, etc; polyethers; polyamides; polyimides, polyesters; polyurethanes; phenolic resins; aminoplast resins; epoxy resins; vinyl and vinylidene polymers such as polyvinyl chloride, polyvinylidene chloride, etc.; and the like.

As has been noted briefly above, the ethylenically unsaturated saccharide coupling agents of interest herein are especially beneficial when employed in conjunction with curable or thermosettable matrix polymer or resin systems (e.g., unsaturated polyester resins and the like) which ultimately are cured or crosslinked by way of an addition polymerization mechanism.

As will be readily apparent to those skilled in the art, the above-described ethylenically unsaturated saccharide material will range from some which are relatively polar or hydrophilic (or even water soluble) in character (such as, for example, ethylenically unsaturated derivatives of starch, carboxymethyl cellulose, hydroxyethyl cellulose, etc.) to those which are relatively hydrophobic (or organic solvent soluble) in character. As such, the selection of the most appropriate or desirable coupling agent species to employ in a given instance will depend largely upon the identity and character of the matrix polymer to be employed in the filled or reinforced composition of interest and, as a general rule, the relatively hydrophilic coupling agent materials will preferably be employed in conjunction with relatively polar matrix polymers and the relatively hydrophobic coupling agent materials will typically be utilized with relatively non-polar matrix polymer systems.

Filler and/or fiber reinforcing materials suitable for use herein include inorganic fibrous substances, inorganic particulate substances, organic fibrous substances and organic particulate substances. Examples of such fiber and filler material include glass fibers; hollow or solid glass microspheres; glass flakes; metallic oxides; talc; kaolin; feldspar; carbides; calcium salts such as calcium carbonate, calcium sulfate, etc.; barium salts such as barium sulfate; sulfides; titanates; metal flakes and fillers; antimony oxides; alumina trihydrate; carbon black; mica; aluminum diboride; graphite powders or fibers; ceramic fillers and fibers; particulate or fibrous organic polymer materials such as polyolefin, polyamide, polyester, etc.; and the like.

The particle size of the various fiber and filler materials employed herein is not particularly critical and such fiber and filler materials will typically correspond generally to those conventionally employed in known filled and/or fiber reinforced polymer compositions. It can, however, be noted that as a general rule, such materials will have a particle size in the range of from about 0.1 to about 100 microns for particulate materials and, in the case of fibrous materials, diameters thereof will typically range from about 1 micron to about 10 millimeters and lengths will typically range from as little as 10 micron up to essentially continuous fiber materials.

In carrying out the process of the present invention, the above-described ethylenically unsaturated saccharide coupling agent is first applied to the surface of the particular or fiberous filler and/or reinforcing material of interest and the resulting coated filler and/or reinforcing material is thereafter intimately admixed with the matrix polymer material which is to be filled and/or reinforced thereby. The precise technique employed in applying the saccharide coupling agent to the filler or reinforcing material is not especially critical and several suitable alternatives are available for so-doing. For example, said coupling agent may conveniently be dissolved in a suitable solvent for same (e.g., water in the case of relatively hydrophilic materials such as the ethylenically unsaturated starch derivatives of Verbanac's U.S. Pat. No. 4,060,506 and organic solvents in the case of relatively hydrophobic coupling agent materials such as the ethylenically unsaturated cellulose ester or ether derivatives of Verbanac's U.S. Pat. No. 4,490,516) and the resulting solution can then be sprayed upon, admixed with or otherwise deposited on or contacted with the particulate or fibrous filler and/or reinforcing material of interest. In such event, said solvent oftentimes is preferably removed from the resulting coupling agent-coated filler or reinforcing material (e.g., by filtration, centrifugation, evaporation, or the like) prior to the step in which said coated reinforcing or filler material is intimately admixed with the matrix polymer material of interest.

In an alternative embodiment, the unsaturated saccharide coupling agent material can, if desired, be melted and applied to or coated upon the filler or reinforcing material in molten form be admixing same (in said molten form and with vigorous agitation) with said filler or reinforcing material.

In yet another embodiment, the unsaturated saccharide coupling agent material can also be applied to the filler or reinforcing material in the form of an emulsion of same in carrier fluid in which said saccharide material is insoluble and immiscible. In said emulsion, the dispersed saccharide coupling agent phase will be in liquid form at the time of application to or contact with the filler or reinforcing material of interest and such can be conveniently achieved by utilizing an emulsion in which the dispersed saccharide-containing phase is composed of a solution of said saccharide coupling agent in a suitable solvent therefor.

In any event, the indicated coupling agent material will preferably be applied to the filler and/or reinforcing material in the form of a liquid composition composed of or comprising same and any carrier fluid and/or solvent for same will preferably be substantially or completely removed from the resulting coupling agent-coated filler and/or reinforcing material prior to admixing same with the matrix polymer of interest.

Typically, the indicated saccharide coupling agent material will be applied in an amount corresponding to about 0.01 to about 5 weight percent (preferably from about 0.1 to about 3 weight percent and most preferably from about 0.25 to about 1.5 weight percent) based upon the weight of said filler and/or reinforcing material.

Once the ethylenically unsaturated saccharide coupling agent-coated filler and/or reinforcing material has been prepared, it can then be incorporated into (e.g., intimately admixed with) the desired matrix polymer in any convenient, conventional fashion. Thus, in the case of thermoplastic matrix polymers, the coated filler and/or reinforcing material can be conveniently incorporated therein by way of a melt processing/mixing procedure such as, for example, in an extrusion compounding process or procedure, a roll compounding operation, and the like. On the other hand, when the matrix polymer of interest is a thermosetting polymer system, the coupling agent-coated filler and/or reinforcing material is conveniently admixed with or blended into one or more prepolymer or polymer precursor ingredients as, for example, in a roll compounder, planetary mixer, extruder, sigma blade mixer, etc. prior to the curing or crosslinking of said matrix polymer material.

Use of the filled and/or reinforced polymer compositions prepared in accordance with the present invention to ultimately make finished, shaped filled and/or reinforced polymeric or plastic articles or products will also be in accordance with known fabrication techniques such as, for example, conventional thermoplastic injection molding procedures, reaction injection molding (RIM) operations, thermoforming and curing of sheet molding compounds (SMC), forming and curing of bulk molding compounds (BMC), pultrusion, and the like.

The present invention is further illustrated and understood by reference to the following examples in which all parts and percentages are on a weight basis and all temperatures are in degrees Celsius unless otherwise indicated.

EXAMPLE 1

This example illustrates the adhesion enhancing effects provided for various substrates when an ethylenically unsaturated cellulosic material is incorporated into an unsaturated polyester resin coating composition applied thereto.

The four resin formulations described in Table 1 below are prepared by dissolving the ethylenically unsaturated cellulosic material in the unsaturated polyester resin and adding methyl ethyl ketone peroxide and cobalt octoate.

The resulting formulations are then applied as a 5 mil thick coating to various substrates (i.e., glass, aluminum, galvanized steel, clean steel, and chemically treated steel using a wire wound rod and are cured in an oven at 125° C. for 10 minutes.

The resulting samples are then evaluated as to the adhesion of the coating to the substrate in accordance with Method A ("X-Cut Tape Test") of ASTM D3359. The results of such testing are summarized in Table 2 below.

TABLE 1

| Ingredients (parts by weight) | (Control) Formulation A | Formulation B | Formulation C | Formulation D |
|---|---|---|---|---|
| Unsaturated Polyester Resin[1] | 100 | 95 | 90 | 85 |
| Unsaturated cellulose ester[2] | 0 | 5 | 10 | 15 |
| Methyl-ethyl ketone peroxide (initiator) | 2.5 | 2.5 | 2.5 | 2.5 |
| Cobalt Octoate (accelerator) | 1 | 1 | 1 | 1 |
| TOTAL | 103.5 | 103.5 | 103.5 | 103.5 |

[1]Orthophthalic anhydride/ethylene or propylene glycol/maleic anhydride-based unsaturated polyester resin.
[2]Acrylamidomethyl cellulose acetate butyrate (acrylamide D.S. = 0.1).

TABLE 2

| | X-CUT TAPE ADHESION | | | |
|---|---|---|---|---|
| Substrate | (Control) Formulation A | Formulation B | Formulation C | Formulation D |
| Glass | 4A | 4A | 5A | 5A |
| Aluminum | 0A | 2A | 2A | 3A |
| Galvanized Steel | 1A | 2A | 3A | 3A |
| Clean Steel | 5A | N.D.[1] | 5A | N.D. |
| Chemically Treated Steel | 3A | N.D. | 5A | N.D. |

[1]N.D. = Not determined.

As can be seen from the results in Table 2, the inclusion of the unsaturated cellulose ester material in the unsaturated polyester resin coating composition substantially improves the adhesion thereof to substrates such as glass, aluminum, galvanized steel, and chemically treated steel.

EXAMPLE 2

In this example, an ethylenically unsaturated cellulose ester material is employed as a coupling agent for calcium carbonate filler in a reinforced/filled unsaturated polyester resin composition. For comparative purposes a corresponding composition is prepared in which is calcium carbonate filler is not treated or coated with said unsaturated cellulose ester material.

The ingredients of these polyester resin formulations are presented in Table 3 and the physical properties of test specimens prepared therefrom [Cure conditions=1000 psi (6,893 KPA) and 300° F. (149° C.) for 3 to 3.5 minutes] are summarized in Table 4 below.

TABLE 3

| Ingredients (parts by weight) | (Control) Formulation E | Formulation F |
| --- | --- | --- |
| Unsaturated Polyester Resin[1] | 133 | 133 |
| ¼" Glass Fiber | 78 | 78 |
| Calcium Carbonate Filler | 275 | 0 |
| Coated Calcium Carbonate Filler[2] | 0 | 275 |
| Low Profile Additive[3] | 7.5 | 7.5 |
| t-Butyl Perbenzoate | 1.5 | 1.5 |
| Zinc Stearate | 5.0 | 5.0 |

[1]Orthophthalic anhydride/maleic anhydride/ethylene or propylene glycol-based polyester resin.
[2]Acrylamidomethylated cellulose acetate butyrate (0.3 acrylamide D.S.) coating applied at about 1 weight percent based upon the calcium carbonate filler weight by slurrying the filler in acetone and then adding the unsaturated cellulose material thereto with agitation.
[3]Solution of polyvinyl acetate (40 weight percent on solution total weight basis) in styrene.

TABLE 4

| Property Evaluated | (Control) Formulation E | Formulation F |
| --- | --- | --- |
| Flexural Stress (psi)[1] | 9,430 (65.02 × 10$^6$ newtons/m$^2$) | 7,960 (54.88 × 10$^6$ newtons/m$^2$) |
| Flexural Modulus (10$^6$ psi) | 2.50 (17.24 × 10$^9$ newtons/m$^2$) | 2.65 (18.27 × 10$^9$ newtons/m$^2$) |
| Tensile Strength (psi)[1] | 3,420 (23.58 × 10$^6$ newtons/m$^2$) | 4,780 (32.96 × 10$^6$ newtons/m$^2$) |
| Notched Izod Impact (ft.-lb./in.) | 4.20 (224.19 joules/m) | 5.50 (293.58 joules/m) |
| Unnotched Izod Impact (ft.-lb./in.) | 6.96 (371.52 joules/m) | 5.08 (271.16 joules/m) |

[1]Determined at 0.1 in./min. (0.254 cm/min) cross head speed.

EXAMPLE 3

In this example, an ethylenically unsaturated cellulose ester is employed as a coupling agent for a ceramic (i.e., aluminum silicate) fiber material in an unsaturated polyester resin formulation. A similar composition in which the ceramic fiber material is not coated with said cellulose ester material is also prepared and evaluated for comparative purposes.

The polyester resin formulations prepared and evaluated in this example are set forth in Table 5 below and the physical properties of test specimens prepared therefrom [Cure conditions=1000 psi (6,893 KPA) and 300° F. (149° C.) for 3.0 to 3.5 minutes] are summarized in Table 6 below.

TABLE 5

| Ingredients (parts by weight) | (Control) Formulation G | Formulation H |
| --- | --- | --- |
| Unsaturated Polyester Resin[1] | 133.0 | 133.0 |
| Low Profile Additive[2] | 7.5 | 7.5 |
| t-butyl perbenzoate | 1.5 | 1.5 |
| Zinc Stearate | 5.0 | 5.0 |
| Calcium Carbonate Filler | 275 | 275 |
| Ceramic Fiber | 19.5 | — |
| Coated Ceramic Fiber[3] | — | 19.5 |
| ¼" Chopped Glass Strand | 58.5 | 58.5 |

[1]Orthophthalic anhydride/maleic anhydride/ethylene or propylene glycol-based unsaturated polyester resin.
[2]Solution of polyvinyl acetate (40 weight % based upon solution weight) in styrene.
[3]Acrylamidomethylated cellulose acetate butyrate (0.3 acrylamide D.S.) coating applied at about 1 weight percent based on the ceramic fiber weight.

TABLE 6

| Property | (Control) Formulation G | Formulation H |
| --- | --- | --- |
| Tensile Strength (psi)[1] | 3,980 (27.44 × 10$^6$ newtons/m$^2$) | 4,470 (30.82 × 10$^6$ newtons/m$^2$) |
| Flexural Strength (psi)[1] | 7,430 (51.23 × 10$^6$ newtons/m$^2$) | 9,676 (66.71 × 10$^6$ newtons/m$^2$) |
| Flexural Modulus (10$^6$ psi) | 2.28 (15.7 × 10$^9$ newtons/m$^2$) | 2.28 (15.7 × 10$^9$ newtons/m$^2$) |
| Notched Izod Impact (ft.-lb./in.) | 4.94 (263.69 joules/m) | 5.73 (305.86 joules/m) |
| Unnotched Izod Impact (ft.-lb./in.) | 4.25 (226.86 joules/m) | 5.48 (292.52 joules/m) |

[1]Determined at cross head speed of 0.2 in./min. (0.508 cm/min)

The effectiveness of the indicated unsaturated cellulose ester material as a coupling agent for filler and/or reinforcing materials is believed to be readily apparent from the results in the foregoing Examples 2 and 3.

While the present invention has been illustrated and described herein by reference to particular examples and embodiments thereof, such is not to be interpreted as in any way limiting the scope of the instantly presented claims.

What is claimed is:

1. A process for the preparation of filled and/or reinforced polymer compositions, said process comprising the steps of:
   (a) applying a coating of coupling agent material to the surface of a particulate or fibrous filler and/or reinforcing material, said coupling agent material comprising a saccharide derivative having pendant ethylenically unsaturated groups covalently bonded thereto; and
   (b) intimately admixing the resulting coated filler and/or reinforcing material with a natural or synthetic polymeric material.

2. The process of claim 1 wherein the filler and/or reinforcing material is an inorganic fibrous substance.

3. The process of claim 1 wherein the filler and/or reinforcing material is an inorganic particulate substance.

4. The process of claim 1 wherein the filler and/or reinforcing material is an organic fibrous substance.

5. The process of claim 1 wherein the filler and/or reinforcing material is an organic particulate substance.

6. The process of claim 1 wherein the polymeric material is a thermoplastic resin.

7. The process of claim 1 wherein the polymeric material is a thermosettable polymeric composition.

8. The process of claim 1 wherein the coupling agent is applied in liquid form.

9. The process of claim 8 wherein said coupling agent is applied in the form of a homogeneous solution of same in a suitable solvent system.

10. The process of claim 8 wherein said coupling agent is applied in molten form at temperature above its melting point.

11. The process of claim 8 wherein said coupling agent is applied as an emulsion composed of a discontinuous dispersed phase comprising a solution of said coupling agent in a suitable solvent therefor and continuous phase of a liquid material which is immiscible with the coupling agent/solvent solution.

12. The process of claim 1 wherein the coupling agent material is a cellulose derivative having pendant ethylenically unsaturated groups covalently bonded thereto.

13. The process of claim 1 wherein the coupling agent material is a cellulose derivative having acrylamide or 2-alkyl acrylamide groups covalently bonded thereto.

14. The process of claim 1 wherein the coupling agent material is a polymerizable cellulose ester or ether product which is capable of homopolymerization and copolymerization with vinyl monomers and which is soluble in organic solvents, said product having an ester or ether degree of substitution of between 2.0 and about 2.9 and being characterized by having been reacted with an acrylamide reactant containing a methylol or methylthiol group so as to attach pendant acrylamide functionality corresponding to an acrylamide functionality degree of substitution of at least about 0.05.

15. The process of claim 1 wherein the coupling agent material is a starch derivative having pendant ethylenically unsaturated groups covalently bonded thereto.

16. The process of claim 1 wherein the coupling agent material is a starch derivative having acrylamide or 2-alkyl acrylamide groups covalently bonded thereto.

17. The process of claim 1 wherein the coupling agent material is a starch derivative comprising a starch chain having appendant acrylamide functional groups covalently bonded thereto with said acrylamide functional group being characterized as containing moieties of the structure:

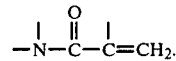

18. The process of claim 1 wherein the coupling agent material is applied to the particulate or fibrous filler and/or reinforcing material in an amount corresponding to about 0.01 to about 10 weight percent based upon the weight of said filler and/or reinforcing material.

19. The process of claim 1 wherein the coupling agent material is applied to the particulate or fibrous filler and/or reinforcing material in an amount corresponding to about 0.25 to about 1.5 weight percent based upon the weight of said filler and/or reinforcing material.

20. The process of claim 1 wherein the natural or synthetic polymeric material is a polyester resin.

21. The process of claim 20 wherein the polyester resin is a thermosettable unsaturated polyester resin.

22. The process of claim 1 wherein the natural or synthetic polymeric material is thermoplastic and is admixed with the coated filler and/or reinforcing material at a temperature in excess of the melting point of said thermoplastic polymer.

* * * * *

UNITED STATES PATENT AND TRADEMARK OFFICE
CERTIFICATE OF CORRECTION

PATENT NO. : 4,663,388

DATED : May 5, 1987

INVENTOR(S) : Eugene F. Douglass et al.

It is certified that error appears in the above-identified patent and that said Letters Patent is hereby corrected as shown below:

Column 2, line 58, for "alkyl polyglucosides" read ---alkyl polyglycosides---

Column 4, line 54, for "100 microns" read ---1000 microns---

Column 4, line 62, for "particular" read ---particulate---

Signed and Sealed this

Fifteenth Day of December, 1987

Attest:

DONALD J. QUIGG

*Attesting Officer*         *Commissioner of Patents and Trademarks*